United States Patent
Sundaresan et al.

(10) Patent No.: US 10,715,311 B2
(45) Date of Patent: Jul. 14, 2020

(54) SYSTEM AND METHOD FOR BLOCKCHAIN-BASED USER AUTHENTICATION BASED ON A CRYPTOGRAPHIC CHALLENGE

(71) Applicant: Workday, Inc., Pleasanton, CA (US)

(72) Inventors: Prakash Sundaresan, Redmond, WA (US); Lionello G. Lunesu, Peng Chau (HK); Antoine Cote, Sheung Wan (HK)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 15/973,468

(22) Filed: May 7, 2018

(65) Prior Publication Data

US 2019/0036680 A1 Jan. 31, 2019

Related U.S. Application Data

(63) Continuation-in-part of application No. 15/662,417, filed on Jul. 28, 2017.

(51) Int. Cl.
*H04L 9/14* (2006.01)
*H04L 9/06* (2006.01)
(Continued)

(52) U.S. Cl.
CPC ......... *H04L 9/0637* (2013.01); *H04L 9/0869* (2013.01); *H04L 9/14* (2013.01);
(Continued)

(58) Field of Classification Search
CPC ... H04L 9/0825; H04L 9/0823; H04L 9/0807; H04L 9/3247; H04L 9/3213
See application file for complete search history.

(56) References Cited

U.S. PATENT DOCUMENTS 9,397,980 B1 * 7/2016 Chen .................. H04L 9/3263
2008/0010449 A1 * 1/2008 Holtzman ............ G06F 21/445
713/157
(Continued)

FOREIGN PATENT DOCUMENTS

GB 2539430 A * 12/2016 ........... G06Q 20/065

OTHER PUBLICATIONS

Andreas M. Antonopoulos, "Mastering Bitcoin Programming the Open Blockchain", Jun. 1, 2017, O'Reilly, 2nd Edition, Chapter 5 (Year: 2017).
(Continued)

*Primary Examiner* — Ellen Tran
(74) *Attorney, Agent, or Firm* — Van Pelt, Yi & James LLP (57) ABSTRACT

An embodiment herein provides a processor implemented method for blockchain-based authentication of a user using a user device, that includes (i) obtaining an identify information associated with an identity document of the user; (ii) storing the identity information, and a set of credentials, with a blockchain to link the identity information with the set of credentials for the user; (iii) obtaining a cryptographic challenge from a relying party device when a record that includes a user identity information of the user and the set of credentials associated with the user identity information for the user device is found to be stored with the blockchain; and (iv) transmitting a response to the cryptographic challenge to the relying party device. The relying party device checks whether the response matches with a predetermined correct response or not. The relying party device authenticates the user only if the response matches with the predetermined correct response.

9 Claims, 6 Drawing Sheets

(51) Int. Cl.
*H04L 9/30* (2006.01)
*H04L 9/32* (2006.01)
*H04L 9/08* (2006.01)

(52) U.S. Cl.
CPC .............. *H04L 9/30* (2013.01); *H04L 9/3226* (2013.01); *H04L 9/3268* (2013.01); *H04L 9/3271* (2013.01); *H04L 2209/38* (2013.01)

(56) References Cited

U.S. PATENT DOCUMENTS

| | | | |
|---|---|---|---|
| 2010/0138652 A1* | 6/2010 | Sela | G06F 21/445 713/158 |
| 2016/0086175 A1* | 3/2016 | Finlow-Bates | H04L 9/3271 705/77 |
| 2016/0261411 A1* | 9/2016 | Yau | H04L 63/0807 |
| 2016/0275461 A1* | 9/2016 | Sprague | G06Q 20/0655 |
| 2017/0147808 A1* | 5/2017 | Kravitz | G06F 21/45 |
| 2017/0155513 A1 | 6/2017 | Acar | |
| 2017/0180128 A1* | 6/2017 | Lu | H04L 9/08 |
| 2017/0222815 A1 | 8/2017 | Meriac | |
| 2017/0344988 A1* | 11/2017 | Cusden | H04L 9/3247 |
| 2017/0357966 A1 | 12/2017 | Chandrasekhar | |
| 2018/0006826 A1 | 1/2018 | Smith | |
| 2019/0266334 A1 | 8/2019 | Robison | |

OTHER PUBLICATIONS

Biryukov et al., "Argon2: new generation of memory-hard functions for password hashing and other applications", 2016, IEEE, pp. 292-300 (Year: 2016).

\* cited by examiner

FIG. 6

SYSTEM AND METHOD FOR BLOCKCHAIN-BASED USER AUTHENTICATION BASED ON A CRYPTOGRAPHIC CHALLENGE

CROSS-REFERENCE TO RELATED APPLICATIONS

This application is a continuation in part of co-pending U.S. patent application Ser. No. 15/662,417, entitled BLOCKCHAIN-BASED DIGITAL IDENTITY MANAGEMENT (DIM) SYSTEM filed Jul. 28, 2017 which is incorporated herein by reference for all purposes. U.S. patent application Ser. No. 15/662,417 claims priority to U.S. Provisional application Ser. No. 62/368,875, entitled TRUSTED KEY BLOCKCHAIN-BASED IDENTITY MANAGEMENT SYSTEM TOWARDS A WORLD OF STRONG IDENTITY, SECURITY AND SMART CONTRACTS filed Jul. 29, 2016 which is incorporated herein by reference for all purposes, and claims priority to U.S. Provisional patent application Ser. No. 62/489,772, entitled BLOCKCHAIN-BASED CREDENTIAL AND TOKEN MANAGEMENT IN THE TRUSTED KEY IDENTITY SYSTEM filed on Apr. 25, 2017 which is incorporated herein by reference for all purposes. This application is a continuation in part of co-pending U.S. patent application Ser. No. 15/961,791, entitled BLOCKCHAIN-BASED SECURE CREDENTIAL AND TOKEN MANAGEMENT ACROSS MULTIPLE DEVICES filed Apr. 24, 2018 which is incorporated herein by reference for all purposes, which is a continuation in part of co-pending U.S. patent application Ser. No. 15/662,417 entitled BLOCKCHAIN-BASED DIGITAL IDENTITY MANAGEMENT (DIM) SYSTEM filed Jul. 28, 2017, which is incorporated herein by reference for all purposes, which claims priority to U.S. Provisional application Ser. No. 62/368,875, entitled TRUSTED KEY BLOCKCHAIN-BASED IDENTITY MANAGEMENT SYSTEM TOWARDS A WORLD OF STRONG IDENTITY, SECURITY AND SMART CONTRACTS filed Jul. 29, 2016, which is incorporated herein by reference for all purposes, and U.S. Provisional application Ser. No. 62/489,772, entitled BLOCKCHAIN-BASED CREDENTIAL AND TOKEN MANAGEMENT IN THE TRUSTED KEY IDENTITY SYSTEM filed on Apr. 25, 2017 which is incorporated herein by reference for all purposes. U.S. patent application Ser. No. 15/961,791 also claims priority to U.S. Provisional patent application Ser. No. 62/489,772 entitled BLOCKCHAIN-BASED CREDENTIAL AND TOKEN MANAGEMENT IN THE TRUSTED KEY IDENTITY SYSTEM filed Apr. 25, 2017 which is incorporated herein by reference for all purposes. This application also claims priority to U.S. Provisional patent application Ser. No. 62/503,107 entitled ADDITIONAL SCENARIOS IN AN IDENTITY SYSTEM filed May 8, 2017 which is incorporated herein by reference for all purposes.

BACKGROUND

Technical Field

The embodiments herein generally relate to blockchain-based user authentication, and more particularly, to a system and the method for blockchain-based user authentication based on a cryptographic challenge.

Description of the Related Art

The current identification process when a user calls into a call-center is based on "Knowledge Based Authentication" (KBA), where the call-center asks the user one or more questions that supposedly only the user would know the correct answers to. This process of answering questions is not only cumbersome, but also not secure, as the answers to these identity verification questions can be purchased online by others.

Today, there is an increasing number of intelligent devices that are connected to the internet in addition to smart phones, tablet computers and personal computers. These intelligent devices include smart voice-based assistants (e.g. Amazon® Echo), smart thermostats (e.g. Nest®), smart door-locks (e.g. Ring), smart self-driven cars, etc. While these devices open new capabilities, they also create new security problems when the user can securely identify and authenticate themselves to these devices. Accordingly, there remains a need for a secure system and method to authenticate a user to third party services.

SUMMARY

In view of foregoing, an embodiment herein provides a processor implemented method for blockchain-based authentication of a user using a user device. The method includes the steps of: (i) obtaining an identify information associated with an identity document of the user; (ii) storing the identity information, and a set of credentials, with a blockchain to link the identity information with the set of credentials for the user, wherein the set of credentials include a blockchain-compatible public-private key pair associated with the user that is created using a hardware-based cryptographic processor on the user device, wherein blockchain-compatible public-private key pair includes a public key and a private key; (iii) obtaining a cryptographic challenge from a relying party device when a record that includes a user identity information of the user and the set of credentials associated with the user identity information for the user device is found to be stored with the blockchain; and (iv) transmitting a response to the cryptographic challenge to the relying party device, wherein the relying party device checks whether the response matches with a predetermined correct response or not. The relying party device authenticates the user only if the response matches with the predetermined correct response.

In one embodiment, when a call to a relying party is initiated by the user, the relying party device requests the user to provide an account identifier for an account associated with the relying party, the relying party device retrieves the user identity information of the user based on the account identifier, and checks with the blockchain whether the record that comprises the user identity information of the user and the set of credentials for the user device associated with the user identity information is stored with the blockchain. In an embodiment, the user identity information is stored with the blockchain and linked with the set of credentials for the user only if attribute certificates associated with the user identity information are verified. In another embodiment, the public key is published and the private key is protected by at least one of the user's password, biometric or PIN code. In yet another embodiment, the cryptographic challenge includes an original random value. The relying party device communicates the original random value to the user device. The user device encrypts the original random value with the private key of the user to obtain an encrypted random value and communicates the encrypted random value back to the relying party device. The relying party device decrypts the encrypted random value with the public key of the user and verifies that the decrypted random value is the same as the original random value to prove that that the user possesses the corresponding private key.

In another aspect, a processor implemented method for blockchain-based authentication of a user using a relying party device based on a cryptographic challenge is provided. The method includes the steps of: (i) requesting the user to provide an account identifier for an account associated with a relying party; (ii) retrieving an identity information associated with the account identifier; (iii) checking with a blockchain whether a record that includes the identity information and a set of credentials for a user device associated with the identity information that is associated with the account identifier is pre-stored with the blockchain to link the identity information with the set of credentials for the user, wherein the set of credentials include a blockchain-compatible public-private key pair associated with the user that is created using a hardware-based cryptographic processor on the user device, wherein the blockchain-compatible public-private key pair comprises a public key and a private key; (iv) transmitting the cryptographic challenge to the user device associated with the identity information that is associated with the account identifier when the record that includes the identity information of the user and the set of credentials associated with the identity information for the user device is found to be stored with the blockchain; (v) receiving a response to the cryptographic challenge from the user device; (vi) checking whether the response matches with a predetermined correct response or not; and authenticating the user only if the response matches with the predetermined correct response.

In another aspect, a system for blockchain-based authentication of a user using a user device is provided. The system includes a user device processor and a non-transitory computer readable storage medium. The non-transitory computer readable storage medium includes one or more modules executable by the user device processor. The one or more modules includes an identity information registration module and a cryptographic challenge module. The identity information registration module obtains an identity information associated with an identity document of the user to store the identify information, and a set of credentials, with a blockchain to link the identity information with the set of credentials for the user. The identity information uniquely identifies the user. The set of credentials include a blockchain-compatible public-private key pair associated with the user that is created using a hardware-based cryptographic processor on the user device. The blockchain-compatible public-private key pair includes a public key and a private key.

The cryptographic challenge module obtains a cryptographic challenge from a relying party device when the record that includes a user identity information of the user and the set of credentials associated with the user identity information for the user device is found to be stored with the blockchain. In one embodiment, the cryptographic challenge module transmits a response to the cryptographic challenge to the relying party device. The relying party device checks whether the response matches with a predetermined correct response or not. In another embodiment, the relying party device authenticates the user only if the response matches with the predetermined correct response.

In one embodiment, when a call to a relying party is initiated by the user, the relying party device requests the user to provide an account identifier for an account associated with the relying party, the relying party device retrieves the user identity information of the user based on the account identifier, and checks with the blockchain whether the record that comprises the user identity information of the user and the set of credentials for the user device associated with the user identity information is stored with the blockchain. In an embodiment, the user identity information is stored with the blockchain and linked with the set of credentials for the user only if attribute certificates associated with the user identity information are verified.

In another embodiment, the public key is published and the private key is protected by at least one of the user's password, biometric or PIN code. In yet another embodiment, the cryptographic challenge includes an original random value. The relying party device communicates the original random value to the user device. The user device encrypts the original random value with the private key of the user to obtain an encrypted random value and communicates the encrypted random value back to the relying party device. The relying party device decrypts the encrypted random value with the public key of the user and verifies that the decrypted random value is the same as the original random value to prove that that the user possesses the corresponding private key.

In yet another aspect, a system for blockchain-based authentication of a user using a relying party device based on a cryptographic challenge is provided. The system includes a relying party device processor and a non-transitory computer readable storage medium. The non-transitory computer readable storage medium includes one or more modules executable by the relying party device processor. The one or more modules includes a record verification module, a cryptographic challenge module, a response comparison module and a user authentication module. The record verification module requests the user to provide an account identifier for an account associated with a relying party. The record verification module retrieves an identity information associated with the account identifier to check with a blockchain whether a record that includes the identity information and a set of credentials for a user device associated with the identity information that is associated with the account identifier is pre-stored with the blockchain to link the identity information with the set of credentials for the user. The set of credentials include a blockchain-compatible public-private key pair associated with the user that is created using a hardware-based cryptographic processor on the user device. The blockchain-compatible public-private key pair includes a public key and a private key.

The cryptographic challenge module transmits the cryptographic challenge to the user device associated with the identity information that is associated with the account identifier when the record that comprises the identity information of the user and the set of credentials associated with the identity information for the user device is found to be stored with the blockchain. The cryptographic challenge module receives a response to the cryptographic challenge from the user device. The response comparison module checks whether the response matches with a predetermined correct response or not. The user authentication module authenticates the user only if the response matches with the predetermined correct response.

In yet another aspect, one or more non-transitory computer readable storage mediums storing one or more sequences of instructions, which when executed by one or more processors, causes a processor implemented method for blockchain-based authentication of a user using a user device based on a cryptographic challenge is provided. The method include the steps of: (i) obtaining an identify information associated with an identity document of the user, wherein the identity information uniquely identifies the user;

(ii) storing the identity information, and a set of credentials, with a blockchain to link the identity information with the set of credentials for the user, wherein the set of credentials include a blockchain-compatible public-private key pair associated with the user that is created using a hardware-based cryptographic processor on the user device, wherein the blockchain-compatible public-private key pair includes a public key and a private key; (iii) obtaining a cryptographic challenge from a relying party device when a record that includes a user identity information of the user and the set of credentials associated with the user identity information for the user device is found to be stored with the blockchain; and (iv) transmitting a response to the cryptographic challenge to the relying party device. In one embodiment, the relying party device checks whether the response matches with a predetermined correct response or not. The relying party device authenticates the user only if the response matches with the predetermined correct response.

In one embodiment, when a call to a relying party is initiated by the user, the relying party device requests the user to provide an account identifier for an account associated with the relying party, the relying party device retrieves the user identity information of the user based on the account identifier, and checks with the blockchain whether the record that comprises the user identity information of the user and the set of credentials for the user device associated with the user identity information is stored with the blockchain. In an embodiment, the user identity information is stored with the blockchain and linked with the set of credentials for the user only if attribute certificates associated with the user identity information are verified. In another embodiment, the public key is published and the private key is protected by at least one of the user's password, biometric or PIN code. In yet another embodiment, the cryptographic challenge includes an original random value. The relying party device communicates the original random value to the user device. The user device encrypts the original random value with the private key of the user to obtain an encrypted random value and communicates the encrypted random value back to the relying party device. The relying party device decrypts the encrypted random value with the public key of the user and verifies that the decrypted random value is the same as the original random value to prove that that the user possesses the corresponding private key.

In another aspect, one or more non-transitory computer readable storage mediums storing one or more sequences of instructions, which when executed by one or more processors, causes a processor implemented method for blockchain-based authentication of a user using a relying party device is provided. The one or more non-transitory computer readable storage mediums include the steps of: (i) requesting the user to provide an account identifier for an account associated with the relying party; (ii) retrieving an identity information associated with the account identifier; (iii) checking with the blockchain whether a record that includes the identity information and a set of credentials for a user device associated with the identity information that is associated with the account identifier is pre-stored with the blockchain to link the identity information with the set of credentials for the user, wherein the set of credentials include a blockchain-compatible public-private key pair associated with the user that is created using a hardware-based cryptographic processor on the user device, wherein the blockchain-compatible public-private key pair comprises a public key and a private key; (iv) transmitting a cryptographic challenge to the user device associated with the identity information that is associated with the account identifier when the record that includes the user identity information of the user and the set of credentials associated with the user identity information for the user device is found to be stored with the blockchain; (v) receiving a response to the cryptographic challenge from the user device; (vi) checking whether the response matches with a predetermined correct response or not; and (vii) authenticating the user only if the response matches with the predetermined correct response.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

There is a need for a system and method of user authentication management to authenticate the user. Referring now to the drawings, and more particularly to FIGS. 1 through 6, where similar reference characters denote corresponding features consistently throughout the figures, preferred embodiments are shown.

Figure 1:
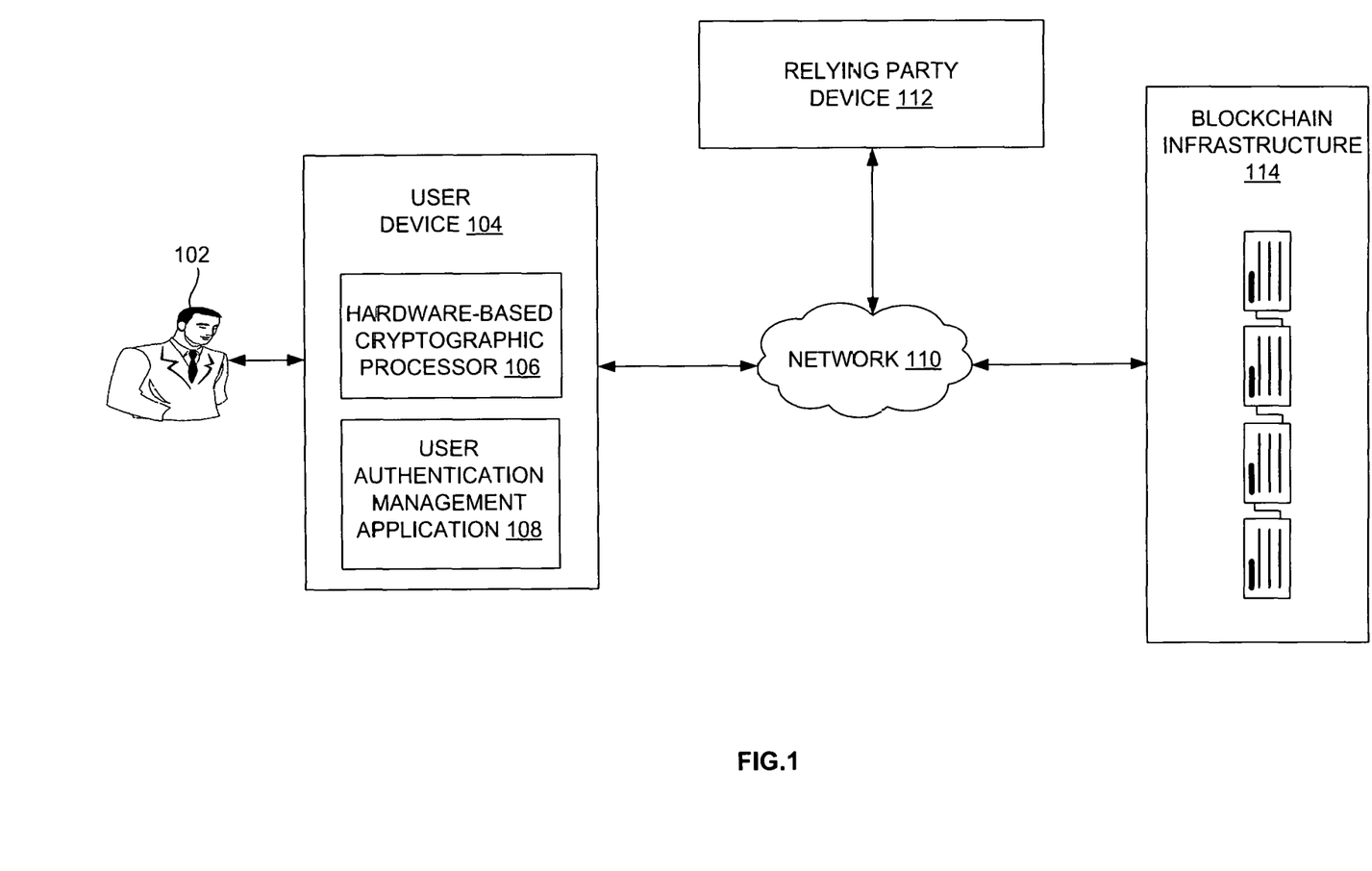
FIG. 1 is a block diagram of a system for blockchain-based user authentication using a user device and a relying party device according to an embodiment herein.

FIG. 1 is a block diagram of a system for blockchain-based user authentication using a user device 104 and a relying party device 112 according to an embodiment herein. The system includes the user device 104, a network 110, the relying party device 112, and a blockchain infrastructure 114. The user device 104 includes a hardware based cryptographic processor 106 and a user authentication management application 108. The user device 104 also includes a device processor (e.g. not shown). A user 102 may self-provision his/her identify credentials by downloading and initializing the user authentication management application 108 on the user device 104. The blockchain infrastructure 114 serves as the registry of the credentials. The hardware based cryptographic processor 106 (e.g. a Secure Enclave processor, ARM Trustzone) creates a set of credentials including a blockchain-compatible public-private key pair associated with the user 102.

The hardware based cryptographic processor 106 is a computer on a chip (e.g. system-on-a-chip) or microprocessor that is dedicated for carrying out cryptographic operations. It is embedded in a packaging with multiple physical security measures, which give it a degree of tamper resistance. In some embodiments, the secure crypto-processor 108 may not output decrypted data or decrypted program instructions in an environment where security cannot always be maintained. The hardware based cryptographic processor 106 also segregates the cryptographic operations from the device processor and thus improves speed and efficiency and improves battery life. For example, iOS® devices may include an advanced encryption standard (AES) 256 crypto engine that is built into a direct memory access (DMA) path between a flash storage and main system memory. The Snapdragon 820 processor that is used by certain android devices also includes a crypto engine.

The credentials, e.g. a blockchain-compatible public-private key pair, include a user public key and a user private key. In one embodiment, the user public key is published and the user private key is protected by at least one of the user's 102 password, biometric or PIN code. In another embodiment, the end user private key cannot ordinarily be extracted out of the hardware-based cryptographic processor 106 by any of a device or operating system (OS) manufacturer, the user 102, or a party that manages an open identity network. The user device 104 may be but it is not limited to a laptop, a mobile phone, a tablet and a personal computer.

Figure 2:
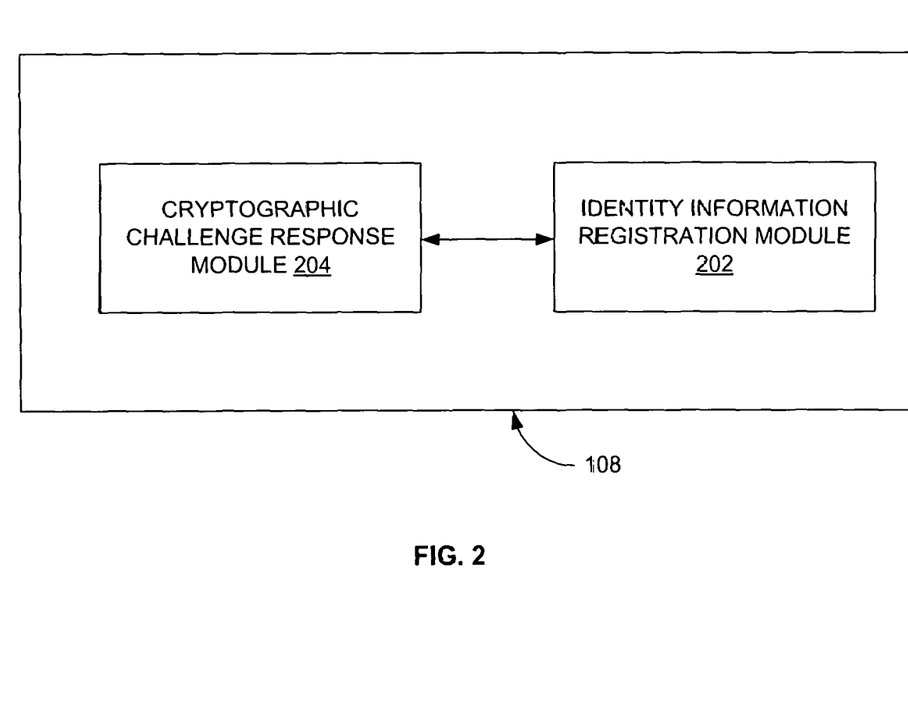
FIG. 2 is a block diagram of a user authentication management application in the user device of FIG. 1 according to an embodiment herein.

FIG. 2 is a block diagram of the user authentication management application 108 in the user device 102 of FIG. 1 according to an embodiment herein. The user authentication management application 108 includes an identity information registration module 202 and a cryptographic challenge module 204. The identity information registration module 202 obtains an identity information associated with an identity document of the user 102 to store the identify information, and a set of credentials, with the blockchain 114 to link the identity information with the set of credentials for the user 102. The identify information may be, but it is not limited to, a user name, date of birth (DOB), address, and a unique identification number. The identity document may be but it is not limited to a driving license or a passport of the user 102. The identity information uniquely identifies the user 102. The identity information is registered with the blockchain 114 and linked with the set of credentials for the user 102. The cryptographic challenge module 204 obtains a cryptographic challenge from the relying party device 112 via the network 110 when the record that includes a user identity information of the user 102 and the set of credentials associated with the user identity information for the user device 104 is found to be stored with the blockchain 114.

The cryptographic challenge module 204 transmits a response to the cryptographic challenge to the relying party device 112 via the network 110. The relying party device 112 checks whether the response matches with a predetermined correct response or not. The relying party device 112 authenticates the user 102 only if the response matches with the predetermined correct response. In one embodiment, when a call to a relying party is initiated by the user, the relying party device 112 requests the user 102 to provide an account identifier for an account associated with the relying party. The relying party device 112 retrieves the user identity information of the user 102 based on the account identifier and checks with the blockchain 114 whether the record that includes the user identity information of the user 102 and the set of credentials for the user device 104 associated with the user identity information is stored with the blockchain 114. In one embodiment, the user identity information is stored with the blockchain 116 and linked with the set of credentials for the user 102 only if attribute certificates associated with the user identity information are verified.

Figure 3:
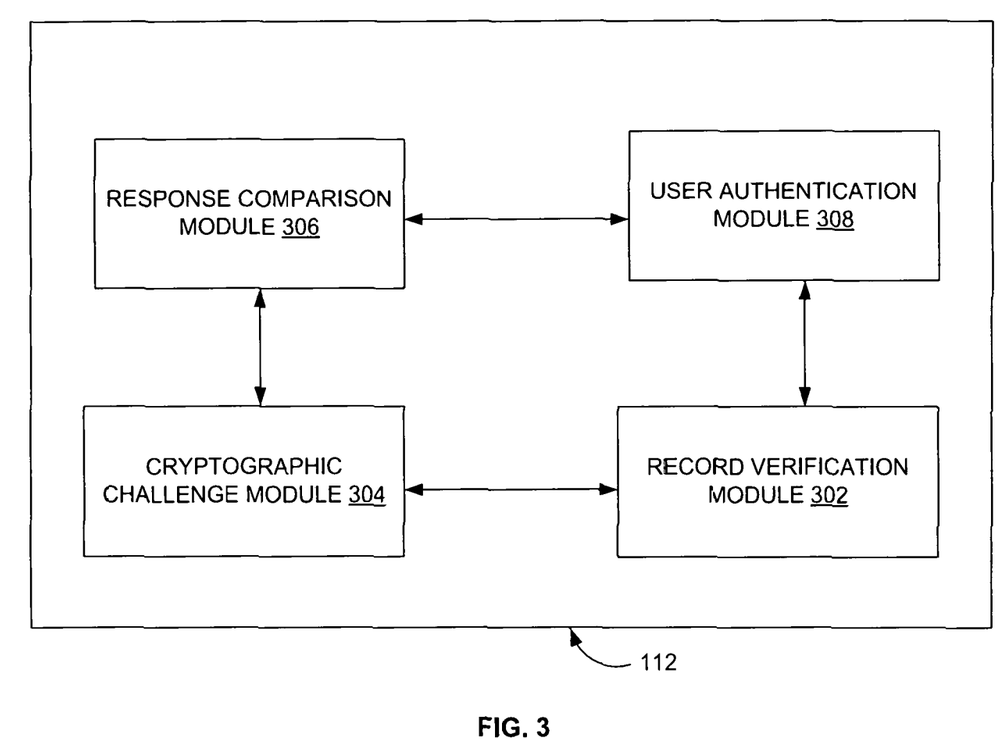
FIG. 3 is a block diagram of the relying party device of FIG. 1 according to an embodiment herein.

FIG. 3 is a block diagram of the relying party device 112 of FIG. 1 according to an embodiment herein. The relying party device 112 includes a record verification module 302, a cryptographic challenge module 304, a response comparison module 306 and a user authentication module 308. The record verification module 302 requests the user 102 to provide an account identifier for an account associated with the relying party. The record verification module 302 retrieves the identity information associated with the account identifier to check with the blockchain 114 whether a record that includes the identity information and the set of credentials for the user device 104 associated with the identity information that is associated with the account identifier is pre-stored with the blockchain 114.

The cryptographic challenge module 304 transmits a cryptographic challenge to the user device 104, via the network 110, associated with the identity information that is associated with the account identifier, when the record that includes the user identity information of the user 102 and the set of credentials associated with the user identity information for the user device 104 is found to be stored with the blockchain 114. The cryptographic challenge includes an original random value. In one embodiment, the relying party device 112 communicates the original random value to the user device 104 via the network 110. The user device 104 encrypts the original random value with the private key of the user 102 to obtain an encrypted random value and communicates the encrypted random value back to the relying party device 112. The relying party device 112 decrypts the encrypted random value with the public key of the user 102 and verifies that the decrypted random value is the same as the original random value to prove that that the user 102 possesses the corresponding private key. The cryptographic challenge module 304 receives a response to the cryptographic challenge from the user device 104. The response comparison module 306 checks whether the response matches with a predetermined correct response or not. The user authentication module 308 authenticates the user 102 only if the response matches with the predetermined correct response.

Figure 4:
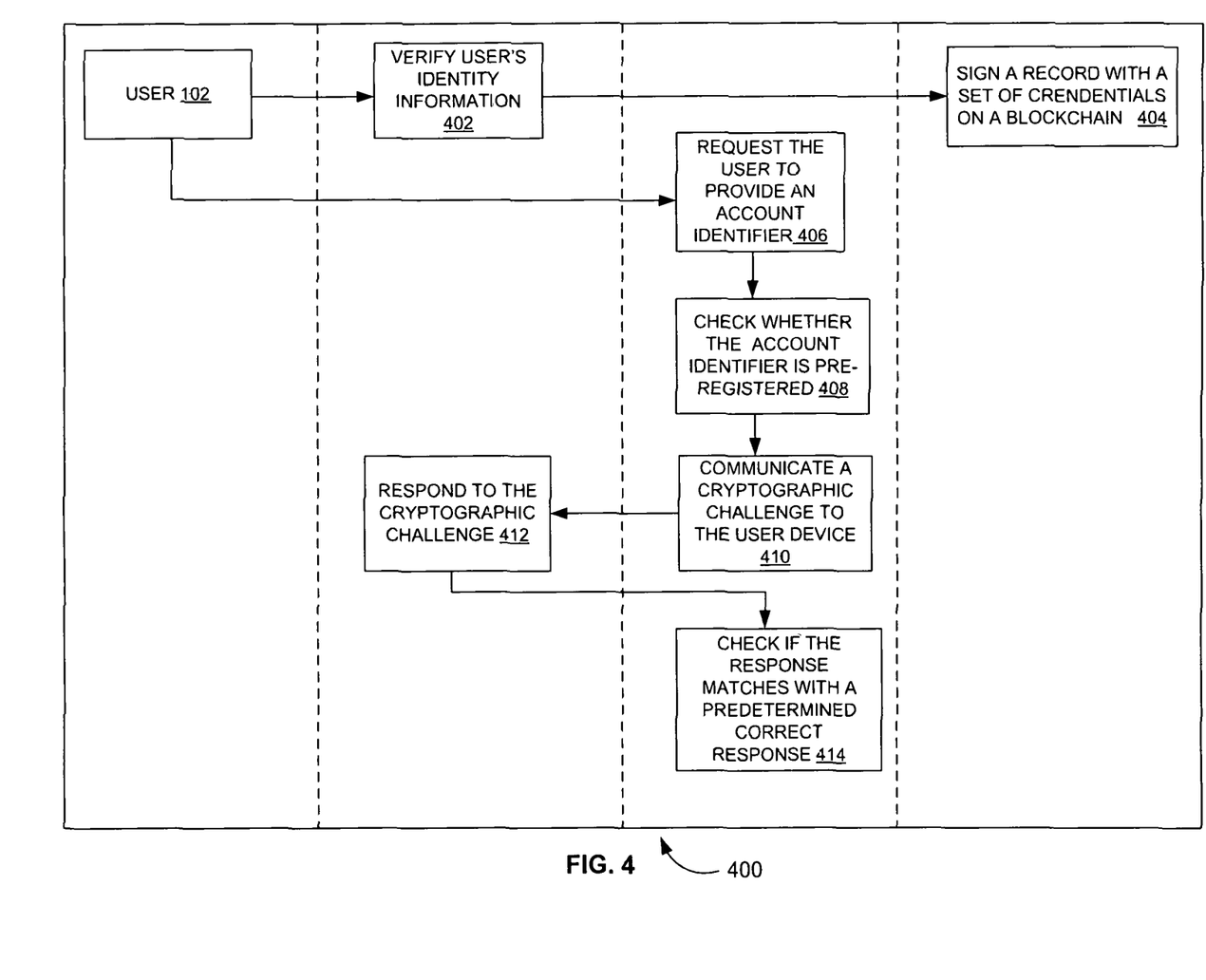
FIG. 4 is a flow chart that illustrates a process of a user having the user device being authenticated by the relying party device through a blockchain of FIG. 1 according to an embodiment herein.

FIG. 4 is a flow chart that illustrates a process of the user 102 having the user device 104 being authenticated by the relying party device 112 through the blockchain 114 of FIG. 1 according to an embodiment herein. At step 402, the user device 104 verifies the user identity information of the user 102. At step 404, the user device 104 signs the record with the set of credentials on the blockchain 114. At step 406, the relying party device 112 requests the user 102 to provide the account identifier. At step 408, the relying party device 112 checks whether the account identifier associated with the user 102 is pre-stored or not. At step 410, the relying party device 112 communicates the cryptographic challenge to the user device 104. At step 412, the user device 104 responds to the cryptographic challenge. At step 414, the relying party device 414 checks whether the response matches with the predefined correct response or not.

Figure 5:
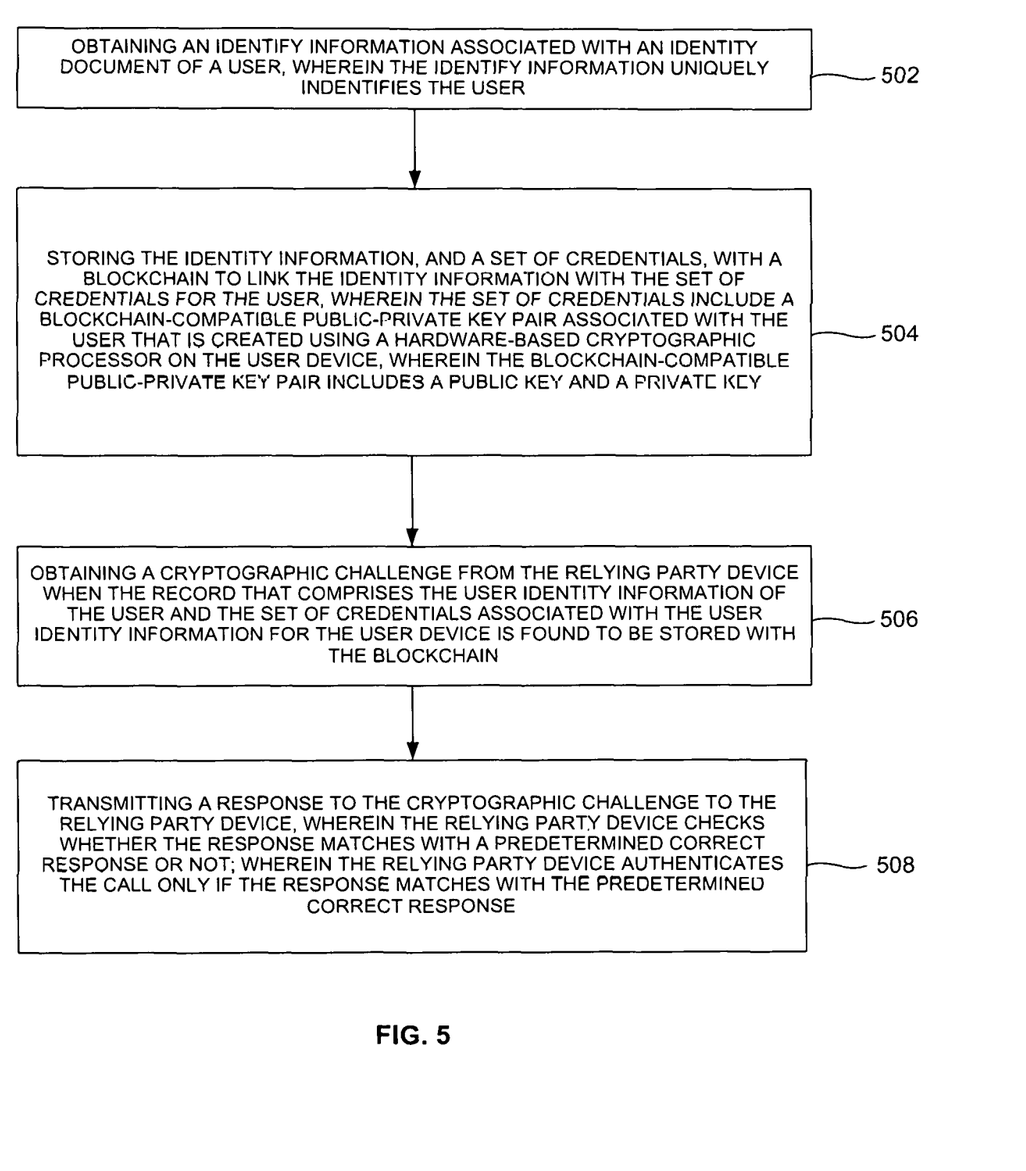
FIG. 5 is a flow chart illustrating a method for blockchain-based user authentication using the user device of FIG. 1 according to an embodiment herein.

FIG. 5 is a flow chart illustrating a method for blockchain-based user authentication using the user device 104 of FIG. 1 according to an embodiment herein. At step 502, the user device 104 obtains an identify information associated with an identity document of the user 102. The identity information uniquely identifies the user 102. At step 504, the user device 104 stores the identity information, and the set of credentials, with the blockchain 114 to link the identity information with the set of credentials for the user 102. In one embodiment, the identity information, and the set of credentials is stored with the blockchain 114 only if attribute certificates associated with the identity information are verified. The set of credentials include the blockchain-compatible public-private key pair associated with the user 102 that is created using the hardware-based cryptographic processor 106 on the user device 104. The blockchain-compatible public-private key pair includes the public key and the private key. At step 506, the user device 104 obtains the cryptographic challenge from the relying party device 112 when the record that includes the user identity information of the user 102 and the set of credentials associated with the user identity information for the user device 104 is found to be stored with the blockchain 114. At step 508, the user device 104 transmits the response to the cryptographic challenge to the relying party device 112. In one embodiment, the relying party device 112 checks whether the response matches with the predetermined correct response or not. The relying party device 112 authenticates the user only if the response matches with the predetermined correct response.

Figure 6:
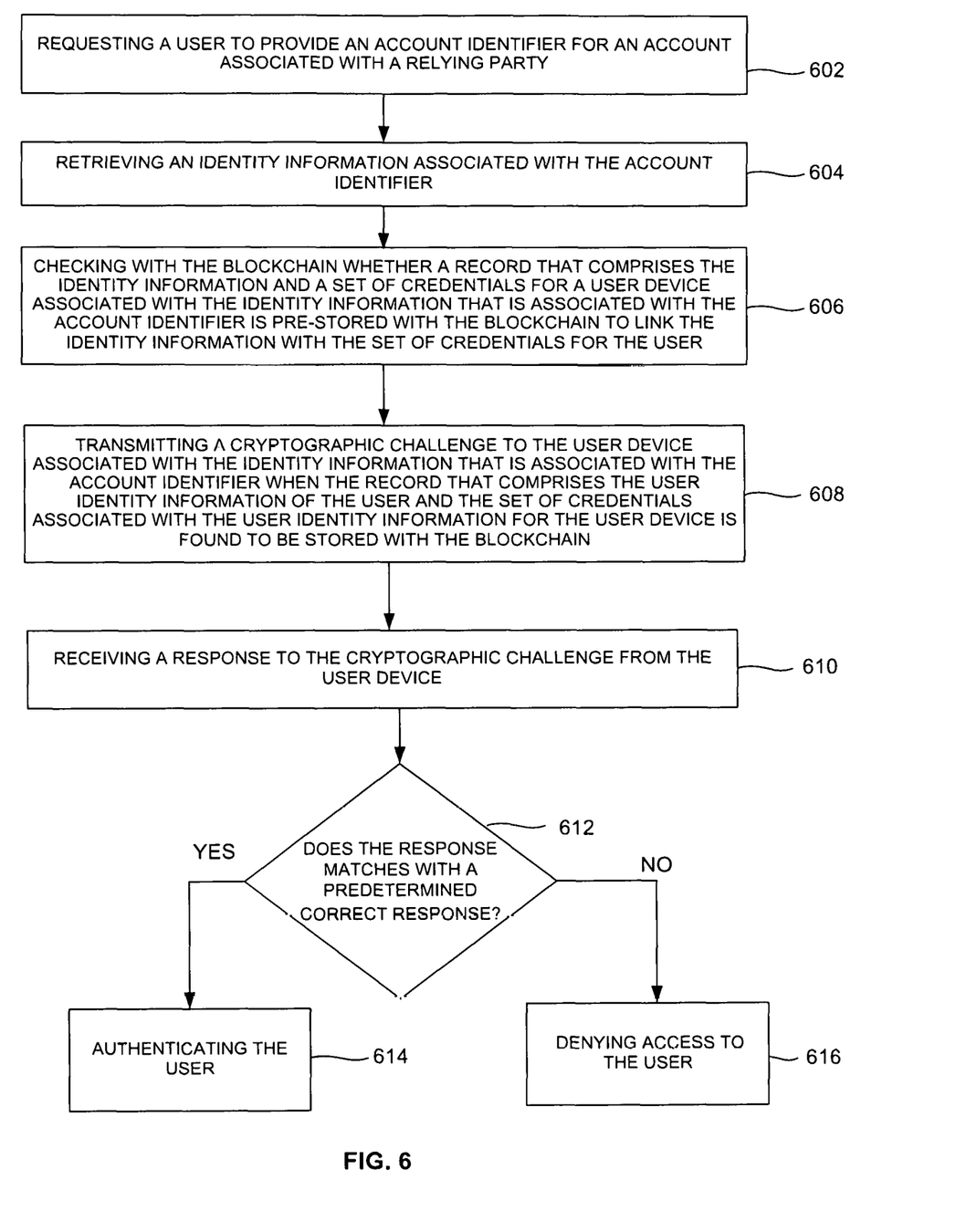
FIG. 6 is a flow chart illustrating a method for blockchain-based user authentication using the relying party device of FIG. 1 according to an embodiment herein.

FIG. 6 is a flow chart illustrating a method for blockchain-based user authentication using the relying party device 112 of FIG. 1 according to an embodiment herein. At step 602, relying party device 112 requests the user 102 to provide the account identifier for the account associated with the relying party. At step 604, the relying party device 112 retrieves the identity information associated with the account identifier. At step 606, the relying party device 112 checks with the blockchain 114 whether the record that includes the identity information and the set of credentials for the user device 104 associated with the identity information that is associated with the account identifier is pre-stored with the blockchain 114 to link the identity information with the set of credentials for the user 102. At step 608, the relying party device 112 transmits the cryptographic challenge to the user device 104 associated with the identity information that is associated with the account identifier when the record that includes the user identity information of the user 102 and the set of credentials associated with the user identity information for the user device 104 is found to be stored with the blockchain 114. At step 610, the relying party device 112 receives the response to the cryptographic challenge from the user device 104. At step 612, the relying party device 112 checks whether the response matches with the predetermined correct response. If yes, the relying party device 112 authenticates the user 102 only if the response matches with the predetermined correct response at step 614. Else, the relying party device 112 denies access to the user 102 at step 616.

The foregoing description of the specific embodiments will so fully reveal the general nature of the embodiments herein that others can, by applying current knowledge, readily modify and/or adapt for various applications without departing from the generic concept, and, therefore, such adaptations and modifications should be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A processor implemented method for blockchain-based authentication of a user, using a user device, the method comprising:
obtaining an identify information associated with an identity document of the user, wherein the identity information uniquely identifies the user;
storing a record with a blockchain, wherein the record comprises the identity information and a set of credentials, wherein the set of credentials comprises a public key of a blockchain-compatible public-private key pair associated with the user that is created using a hardware-based cryptographic processor on the user device, wherein the blockchain-compatible public-private key pair comprises a public key and a private key;
initiating a call to a relying party device;
receiving a request from the relying party device for an account identifier for an account associated with a relying party;
providing the account identifier to the relying party device;
obtaining a cryptographic challenge from the relying party device when the record that comprises the user identity information of the user and the set of credentials is found to be stored with the blockchain, wherein the cryptographic challenge includes a random value; and
transmitting a response to the cryptographic challenge to the relying party device, wherein the response to the cryptographic challenge includes an encrypted random value that is encrypted with the private key of the public-private key pair, wherein the relying party device checks whether the response matches with a predetermined correct response or not in part by obtaining the public key from the blockchain and decrypting the encrypted random value using the obtained public key, wherein the relying party device authenticates the user only if the response matches with the predetermined correct response.

2. The processor implemented method of claim 1, wherein the user identity information is stored with the blockchain and linked with the set of credentials only if attribute certificates associated with the user identity information are verified.

3. The processor implemented method of claim 1, wherein the public key is published and the private key is protected by at least one of the user's password, biometric or PIN code.

4. The processor implemented method of claim 1, wherein the relying party device verifies that the decrypted random value is the same as the random value to prove that that the user device possesses the corresponding private key.

5. A processor implemented method for blockchain-based authentication of a user using a relying party device, the method comprising:
   receiving a call initiated from a user device;
   requesting the user to provide an account identifier for an account associated with the relying party;
   receiving the account identifier from the user device;
   retrieving an identity information associated with the account identifier;
   checking with a blockchain whether a record that comprises the identity information and a set of credentials is pre-stored with the blockchain, wherein the set of credentials comprises a public key of a blockchain-compatible public-private key pair associated with the user that is created using a hardware-based cryptographic processor on the user device, wherein the blockchain-compatible public-private key pair comprises a public key and a private key;
   transmitting a cryptographic challenge to the user device when the record that comprises the identity information of the user and the set of credentials is found to be pre-stored with the blockchain, wherein the cryptographic challenge includes a random value;
   receiving a response to the cryptographic challenge from the user device wherein the response to the cryptographic challenge includes an encrypted random value that is encrypted with the private key of the public-private key pair; and
   checking whether the response matches with a predetermined correct response or not in part by obtaining the public key from the blockchain and decrypting the encrypted random value using the obtained public key, and authenticating the user only if the response matches with the predetermined correct response.

6. A system for blockchain-based authentication of a user using a user device, the system comprising:
   a user device processor;
   a non-transitory computer readable storage medium comprising one or more modules executable by said user device processor, wherein said one or more modules comprises:
      an identity information registration module that obtains an identity information associated with an identity document of the user, wherein the identity information uniquely identifies the user, wherein the identity information registration module stores a record with a blockchain, wherein the record comprises the identity information and a set of credentials, wherein the set of credentials comprises a public key of a blockchain-compatible public-private key pair associated with the user that is created using a hardware-based cryptographic processor on the user device, wherein the blockchain-compatible public-private key pair comprises a public key and a private key; and
      a cryptographic challenge module that obtains a cryptographic challenge from a relying party device when the record that comprises the user identity information and the set of credentials is found to be stored with the blockchain, wherein the cryptographic challenge includes a random value, and wherein the cryptographic challenge module transmits a response to the cryptographic challenge to the relying party device, wherein the response to the cryptographic challenge includes an encrypted random value that is encrypted with the private key of the public-private key pair, wherein the relying party device checks whether the response matches with a predetermined correct response or not in part by obtaining the public key from the blockchain and decrypting the encrypted random value using the obtained public key, wherein the relying party device authenticates the user only if the response matches with the predetermined correct response; and
   wherein the user device processor is configured to:
      initiate a call to the relying party device;
      receive a request from the relying party device for an account identifier for an account associated with a relying party; and
      provide the account identifier to the relying party device.

7. The system of claim 6, wherein the user identity information is stored with the blockchain and linked with the set of credentials only if attribute certificates associated with the user identity information are verified.

8. The system of claim 6, wherein the public key is published and the private key is protected by at least one of the user's password, biometric or PIN code.

9. The system of claim 6, wherein the relying party device verifies that the decrypted random value is the same as the random value to prove that that the user device possesses the corresponding private key.

* * * * *